United States Patent
Mossakowski

(10) Patent No.: US 7,515,757 B2
(45) Date of Patent: Apr. 7, 2009

(54) METHOD FOR MANAGING STORAGE SPACE IN A STORAGE MEDIUM OF A DIGITAL TERMINAL FOR DATA STORAGE ACCORDING TO A PRIORITIZED PIXEL TRANSFER METHOD

(75) Inventor: Gerd Mossakowski, Ahlen (DE)

(73) Assignee: T-Mobile Deutschland GmbH, Bern (DE)

( * ) Notice: Subject to any disclaimer, the term of this patent is extended or adjusted under 35 U.S.C. 154(b) by 235 days.

(21) Appl. No.: 10/520,134

(22) PCT Filed: Jul. 1, 2003

(86) PCT No.: PCT/DE03/02181

§ 371 (c)(1),
(2), (4) Date: Nov. 9, 2005

(87) PCT Pub. No.: WO2004/006186

PCT Pub. Date: Jan. 15, 2004

(65) Prior Publication Data

US 2006/0161686 A1    Jul. 20, 2006

(30) Foreign Application Priority Data

Jul. 2, 2002    (DE) .............................. 102 29 706

(51) Int. Cl.
*G06K 9/36* (2006.01)
(52) U.S. Cl. .................... 382/232; 375/240.01; 709/247
(58) Field of Classification Search ................. 382/232; 375/240.01; 709/247
See application file for complete search history.

(56) References Cited

U.S. PATENT DOCUMENTS 5,748,786 A * 5/1998 Zandi et al. .................. 382/240

(Continued)

FOREIGN PATENT DOCUMENTS

DE    101 13 880 A1    10/2002

(Continued)

*Primary Examiner*—Vikkram Bali
*Assistant Examiner*—Eueng-Nan Yeh
(74) *Attorney, Agent, or Firm*—Browdy and Nemark, PLLC

(57) ABSTRACT

The invention relates to a method for managing storage space in a storage medium of digital terminal equipment for data storage according to the prioritized pixel transmission method, wherein multiple files with pixel groups sorted according to priorities are saved to the storage medium, wherein the method comprises the following steps:
definition of a lower priority threshold value and an upper priority threshold value, wherein the priority threshold values indirectly indicate how much information content of a file is stored on the storage medium,
storage of files in the form of their pixel groups with the highest priority down to a priority corresponding to the selected lower priority threshold value until the available storage space of the storage medium has been filled,
increasing of the lower priority threshold value by one priority level; deletion of all pixel groups with a lower priority than that of the current priority threshold value on the storage medium,
use of the freed storage space in the storage medium for storing further data, the process being continued until the upper priority threshold is reached.

20 Claims, 1 Drawing Sheet

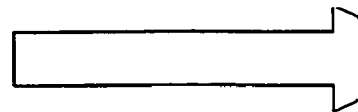

| B1; P1 |
|--------|
| B1; P2 |
| B1; P3 |
| B1; P4 |
| B1, P5 |
| B1; P6 |

Lower threshold value P4

Upper threshold value P2

| | | |
|---|---|---|
| B1; P1 | ... | ... |
| B1; P2 | ... | ... |
| B1; P3 | ... | ... |
| B1; P4 | ... | ... |
| B2; P1 | ... | ... |
| B2; P2 | ... | ... |
| B2; P3 | ... | ... |
| B2; P4 | ... | ... |
| B3; P1 | ... | Bn; P1 |
| B3; P2 | ... | Bn; P2 |
| B3; P3 | ... | Bn; P3 |
| B3; P4 | ... | Bn; P4 |

U.S. PATENT DOCUMENTS

| | | |
|---|---|---|
| 5,867,602 A | 2/1999 | Zandi et al. |
| 5,956,716 A * | 9/1999 | Kenner et al. ............... 707/10 |
| 6,246,797 B1 | 6/2001 | Castor et al. |
| 6,263,313 B1 * | 7/2001 | Milsted et al. ............... 705/1 |
| 6,801,665 B1 * | 10/2004 | Atsumi et al. ............... 382/239 |
| 6,999,626 B2 * | 2/2006 | Andrew ............... 382/235 |
| 7,055,095 B1 * | 5/2006 | Anwar ............... 715/523 |
| 2004/0095996 A1 | 5/2004 | Mossakowski |

FOREIGN PATENT DOCUMENTS

| | | |
|---|---|---|
| DE | 101 52 612 A1 | 10/2002 |
| EP | 0 999 706 A2 | 5/2000 |
| GB | 2 248 707 A | 4/1992 |

\* cited by examiner

FIG. 1

| B1; P1 |
|---|
| B1; P2 |
| B1; P3 |
| B1; P4 |
| B1, P5 |
| B1; P6 |

Lower threshold value P4

Upper threshold value P2

Fig. 2

| B1; P1 | ... | ... |
|---|---|---|
| B1; P2 | ... | ... |
| B1; P3 | ... | ... |
| B1; P4 | ... | ... |
| B2; P1 | ... | ... |
| B2; P2 | ... | ... |
| B2; P3 | ... | ... |
| B2; P4 | ... | ... |
| B3; P1 | ... | Bn; P1 |
| B3; P2 | ... | Bn; P2 |
| B3; P3 | ... | Bn; P3 |
| B3; P4 | ... | Bn; P4 |

Fig. 3

| B1; P1 | ... | ... |
|---|---|---|
| B1; P2 | ... | ... |
| B1; P3 | ... | ... |
| -------- | ... | ... |
| B2; P1 | ... | ... |
| B2; P2 | ... | |
| B2; P3 | ... | |
| -------- | ... | |
| B3; P1 | ... | Bn; P1 |
| B3; P2 | ... | Bn; P2 |
| B3; P3 | ... | Bn; P3 |
| -------- | ... | -------- |

Fig. 4

| B1; P1 | ... | ... |
|---|---|---|
| B1; P2 | ... | ... |
| B1; P3 | ... | ... |
| Bn+1;P1 | ... | ... |
| B2; P1 | ... | ... |
| B2; P2 | ... | ... |
| B2; P3 | ... | ... |
| Bn+1;P2 | ... | ... |
| B3; P1 | ... | Bn; P1 |
| B3; P2 | ... | Bn; P2 |
| B3; P3 | ... | Bn; P3 |
| Bn+1;P3 | ... | -------- |

METHOD FOR MANAGING STORAGE SPACE IN A STORAGE MEDIUM OF A DIGITAL TERMINAL FOR DATA STORAGE ACCORDING TO A PRIORITIZED PIXEL TRANSFER METHOD

FIELD

The invention relates to a method for managing storage space in a storage medium of digital terminal equipment for data storage according to the prioritized pixel transmission method.

BACKGROUND

In multimedial mobile terminal equipment, such as. e.g., digital cameras, mobile telephones, etc., the available storage space is very limited. Multimedial data, such as e.g., image and video data, require a lot of storage space, which is available in mobile terminal equipment only to a very limited degree. Once the maximally available storage space has been filled, the user of the equipment must decide whether he wants to delete the old data content or refrain from storing new data. This fact shall be explained based on the example of a digital camera. Before taking a photograph, the user must adjust on the camera which image resolution the photograph is supposed to have. Modem digital cameras offer multiple picture resolutions to chose from, e.g., 640×480, 800×600 or 1024×768 image points (pixels). If the user selects a lower resolution, e.g., 640×480 pixels, more photographs can be saved to the storage medium of the camera. However, these photographs are then of a lower quality. If the user opts for a higher resolution e.g., 1024×768, only a few photographs will fit on the storage medium. If the user wants to continue taking photographs when the storage medium is full, he must first delete photographs and free storage space by converting existing photographs with a high resolution into photographs with a low resolution and saving them as such. In both cases the available storage space is not optimally used.

The explained example and its associated shortcomings are also applicable to other mobile terminal equipment, e.g., to audio and video terminals.

In EP 0 999 706 A2, a method is known for the dynamic management of a storage device for digital image data that is based on a so-called "embedded coding" of the bitstreams. in this method the image data is sorted according to the importance of the image information, in such a way that the bitstreams are coded such that the most important image information is stored first and the least important image information is stored last. When the storage medium is full, additional image information can be stored only in such a way that the least important image information of the image data that has been stored until then is deleted, so that additional storage space is freed.

A similar method is revealed in U.S. Pat. No. 6,246,797 A, wherein a DCT transform or wavelet transform is used in this case for coding of the image data. If storage space is to be freed, the image information of a complete image must be re-coded in each case, which requires a relatively large amount of computing effort.

U.S. Pat. No. 5,867,602 A reveals a method of coding digital data with the aid of a reversible wavelet transform. An application of this method for storage space management of a storage medium is not described.

All methods known from the prior art do not use a coding method that is based on a prioritized pixel transmission.

SUMMARY

The object of the invention consists of specifying a method whereby the available storage space in multimedial mobile terminal equipment can be optimally used.

This object is met according to the invention in which a method for managing storage space in a storage medium of digital terminal equipment for data storage according to the prioritized pixel transmission method, wherein multiple files with pixel groups sorted according to priorities (P1, P2, ..., Pn) are saved to the storage medium, wherein the method comprises the following steps: a) definition of a lower priority threshold value (Pu) and an upper priority threshold value (Po), wherein the priority threshold values indirectly indicate how much information content of a file is stored on the storage medium; b) storage of files in the form of their pixel groups with the highest priority (P1) down to a priority corresponding to the selected lower priority threshold value (Pu) until the available storage space of the storage medium has been filled; 3) increasing of the lower priority threshold value (Pu) by one priority level; 4) deletion of pixel groups with a lower priority than that of the current priority threshold value (Pu) on the storage medium as soon as additional storage space is needed on the storage medium; and 5) use of the freed storage space on the storage medium for storing further data.

Advantageous further development and improvements of the invention will become apparent from the characteristics of the subclaims. In particular, the present invention provides a method in which it is continued, in dependence upon the required storage space, from method step b) until the upper priority threshold value (Po) is reached. The invention is further characterized in that the priority threshold values (Po, Pu) are adjustable by the user of the terminal equipment. The invention is further characterized in that the priority threshold values (Po, Pu) are permanently preset by the manufacturer of the terminal equipment. The invention is further characterized in that it is applied only to certain files selected by the user of the terminal equipment. The invention is further characterized in that the storage medium comprises multiple partial storage areas, wherein for each partial storage area individual priority threshold values are definable. The invention is further characterized in that the data is subdividable into multiply quality classes, wherein for each quality class individual priority threshold values are definable. The present invention is further characterized in that the pixel groups are formed from digitized scanning values of an audio signal. The invention is further characterized in that the files contain image data, video data or audio data. The invention is further characterized in that certain image/data areas, such as faces or texts contained in the image can be changed by the user in their priority allocation even subsequently.

The inventive method has as its basis the methods for compressing and decompressing image data by means of prioritized pixel transmission, which are described in German patent applications DE 101 13 880.6 (corresponds to PCT/DE02/00987) and DE 101 52 612.1 (corresponds to PCT/DE02/00995, now published as U.S. Patent Application Publication No. 2004/0109609). In these methods, digital video data, for example, is processed, which consists of an array of individual image points (pixels), wherein each pixel has a pixel value that changes with time and that describes color or brightness information of the pixel. According to the invention each pixel or each pixel group is allocated a priority and the pixels are stored in a priority array according to their priority allocation. This array contains, at each moment in time, the pixel values that have been sorted according to the priority allocation. According to this priority allocation, these pixels and the pixel values that have been used to calculate the priority allocation are transmitted and saved. A pixel receives a high priority if the differences in relation to its neighboring pixels are great. For the reconstruction process, the current pixel values in each case are reproduced on the display. The pixels that have not yet been transmitted are calculated from the pixels that have already been transmitted. These methods are independent of the image resolution used. The image resolution remains unchanged.

The revelation of applications DE 101 13 880.6 and DE 101 52 612.1 shall be fully incorporated into the revelation of the present invention.

This means that in the case of the prioritized pixel transmission, those pixel groups with the highest priority allocation, which contain the essential image information, are transmitted first. Thereafter, the pixel groups with the lowest priority allocation are transmitted, which contain negligible image information. The pixel groups with the lowest priority allocation can thus be deleted without significantly impacting the image quality.

The invention takes advantage of this fact.

In the mobile terminal equipment, e.g., in a digital camera, the image data is stored according to the invention in the form of prioritized pixel groups in such a way that for the storage method at least two priority threshold values for a minimum and maximum quality of the image data are specified. These priority threshold values may either be permanently preset by the manufacturer of the terminal equipment or preferably freely selected by the user.

Getting back to the example of the digital camera, all pictures are initially taken with the maximal quality, i.e., the maximum quality, until the capacity limit of the storage medium has been reached, i.e., the storage medium is full. During this process the images are read-in and saved according to the methods described in DE 101 13 880.6 and DE 101 52 612.1, i.e., they are grouped into pixel groups and stored in the order of their priority, that is to say their "image importance".

BRIEF DESCRIPTION OF THE DRAWINGS

FIG. 1 illustrates storage of image data with different priority values according to one embodiment of the invention;

FIG. 2 illustrates storage of image data in pixel groups with different priority values according to one embodiment of the invention;

FIG. 3 illustrates deletion of pixel groups from all stored image data according to one embodiment of the invention; and FIG. 4 illustrates storage space being freed by the method according to the present invention.

DETAILED DESCRIPTION

An example embodiment of the invention will be explained based on the drawings FIG. 1 through FIG. 4.

The image processing method operates, for example, with maximally six priority levels P1-P6. In practice it is possible to advantageously operate with a significantly larger number of priority levels. The priority levels P1-P6 are assigned in each case to individual pixel groups of the image data B1, B2, . . . , Bn to be stored. P1 corresponds to the highest, P6 to the lowest priority level. For storing acquired image data, the user selects for example P4 (maximum quality) as the lower priority threshold and P2 (minimum quality) as the upper priority threshold. Maximum quality means that more pixel groups are available per image for reconstruction of the image than, in comparison, at the minimum quality.

According to FIG. 1, first the pixel groups whose priority is greater or equal to the lower priority threshold, i.e., the pixel groups with the priority P1 through including priority P4 are stored for each newly read-in image. The pixel groups with P5 and P6 are not stored. This is illustrated schematically in FIG. 2.

When the storage medium is full and the user now wishes to take additional pictures, all pixel groups that fall below certain priority thresholds are deleted from the storage according to the invention, i.e., the pixel groups are deleted according to the reverse order of their importance. In accordance with the invention, the lower priority threshold is now raised from P4 to P3 so that from all images saved so far, those pixel groups are deleted that fall below the priority threshold P3, that is to say the pixel groups with the priority P4. FIG. 3 shows that from all stored image data B1, B2, . . . , Bn, the pixel groups with the priority P4 were deleted. If there are, as in the shown example, only 6 priority levels, approximately ⅙ of the available storage space is freed for new image data. This means, especially if, for example, only 1 new image is to be added, a significant loss of quality in the existing images so that, in practice, a significantly higher number of priority levels is used so that always only the required amount of storage space is freed without resulting in an overly large loss of quality in the existing images.

FIG. 4 shows that the storage space freed by this method can be used to store new images. For example, new image data Bn+1 are saved in the form of pixel groups P1, P2, P3, which are saved to the corresponding freed storage positions of the storage medium.

When the capacity limit of the storage medium has once more been reached, the above-described method can be repeated until the lower priority threshold value corresponds to the upper priority threshold value, in the present example P2. In the example, this means that the priority threshold value is increased one level at a time from P4 to P3 up to P2, depending on the number of images to be stored, so that matching storage space is freed for storing new images.

The user can optionally select, at the price of quality, which images or image data are to be released for freeing new storage space. He can, for example, block access to particularly important image data, so that these images remain intact at their full acquisition quality.

An improvement of the invention provides that the user can select, in dependence upon the type of equipment, different images with different quality limits if required, or assign certain quality levels to the images.

Also, certain image/data areas, such as faces or text contained in the image, can subsequently be changed in the priority allocation by the user. After regeneration of the image from the stored data, the user can mark in the image certain areas of particular interest to him, e.g., faces. These marked areas are then stored with a higher priority along with the entire image.

This method advantageously provides for an optimized utilization of the total storage space of a storage medium in each case. The user does not have to consider in advance, or not to the same degree as with the conventional image storage technology, which image resolution he wants to use for which image. Depending on the number of saved images, they are always present at the maximally possible image quality, which is limited by the available storage space.

The method described here can be applied not only for storing image data, but it is applicable in the same manner for audio or video data, provided that this data can be stored with the aid of the methods of the prioritized pixel groups.

According to one embodiment of the invention, the storage medium comprises multiple partial storage areas, wherein for each partial storage area individual priority threshold values are definable. The invention is further characterized in that the data is subdividable into multiply quality classes, wherein for each quality class individual priority threshold values are definable. The present invention is further characterized in that the pixel groups are formed from digitized scanning values of an audio signal. The invention is further characterized in that the files contain image data, video data or audio data. The invention is further characterized in that certain image/data areas, such as faces or texts contained in the image can be changed by the user in their priority allocation even subsequently.

What is claimed is:

1. A method for managing storage space in a storage medium of digital terminal equipment for data storage of images according to a prioritized pixel transmission method, wherein each image is stored in a data file that consists of an array of individual image pixels, wherein each pixel has a pixel value that describes the color or brightness information of the pixel, the method comprising the following steps:
   a. determining a priority value for each pixel of the array by calculating a pixel difference value based on the given pixel value of the pixel in relation to the pixel values of a previously selected group of neighboring pixels, the priority values indicating the relative importance of the respective pixels to the image;
   b. grouping the pixels that are used for calculating the priority value into a pixel group;
   c. sorting pixel groups of the image array based on their priority values;
   d. saving multiple data files with pixel groups sorted by priority ($P_1, P_2, \ldots, P_n$) on the storage medium;
   e. selecting a lower priority threshold value (Pu) and an upper priority threshold value (Po), wherein the priority threshold values indirectly indicate how much information content of a file is stored on the storage medium, the lower priority threshold means that a greater number of pixel groups are available for reconstruction of the image, and the upper priority threshold means that a fewer number of pixel groups are available for reconstruction of the image;
   f. storing files in the form of their pixel groups having priority values between the highest priority ($P_1$) and a priority corresponding to the selected lower priority threshold value (Pu) until the available storage space of the storage medium has been filled;
   g. increasing the lower priority threshold value (Pu) by one priority level;
   h. deleting pixel groups with a lower priority than that of the current priority threshold value (Pu) on the storage medium when additional storage space is needed on the storage medium to create freed storage space; and
   i. using the freed storage space in the storage medium for storing further data.

2. A method as set forth in claim 1, further comprising the steps of repeating, in dependence upon the required storage space, steps b)-e) until the upper priority threshold (Po) is reached.

3. A method as set forth in claim 1, wherein the priority threshold values (Po, Pu) are adjustable by the user of the terminal equipment.

4. A method as set forth in claim 1, wherein the priority threshold values (Po, Pu) are permanently preset by the manufacturer of the terminal equipment.

5. A method as set forth in claim 1, wherein the method steps are applied only to certain files selected by the user of the terminal equipment.

6. A method as set forth in claim 1, wherein the storage medium comprises multiple partial storage areas, wherein for each partial storage area individual priority threshold values are definable.

7. A method as set forth in claim 1, wherein the data is subdividable into multiple quality classes, wherein for each quality class individual priority threshold values are definable.

8. A method as set forth in claim 1, wherein the pixel groups are formed from digitized scanning values of an audio signal.

9. A method as set forth in claim 1, wherein the files contain image data, video data or audio data.

10. A method as set forth in claim 1, wherein certain image/data areas, such as faces or texts contained in the image can be changed by the user in their prioritization even subsequently.

11. A method as set forth in claim 2, wherein the priority threshold values (Po, Pu) are adjustable by the user of the terminal equipment.

12. A method as set forth in claim 11, wherein the method steps are applied only to certain files selected by the user of the terminal equipment.

13. A method as set forth in claim 12, wherein the storage medium comprises multiple partial storage areas, wherein for each partial storage area individual priority threshold values are definable.

14. A method as set forth in claim 13, wherein the data is subdividable into multiple quality classes, wherein for each quality class individual priority threshold values are definable.

15. A method as set forth in claim 14, wherein the pixel groups are formed from digitized scanning values of an audio signal.

16. A method as set forth in claim 15, wherein the files contain image data, video data or audio data.

17. A method as set forth in claim 16, wherein certain image/data areas, such as faces or texts contained in the image can be changed by the user in their prioritization even subsequently.

18. A method as set forth in claim 2, wherein the priority threshold values (Po, Pu) are permanently preset by the manufacturer of the terminal equipment.

19. A method as set forth in claim 18, wherein the method steps are applied only to certain files selected by the user of the terminal equipment.

20. A method as set forth in claim 19, wherein the storage medium comprises multiple partial storage areas, wherein for each partial storage area individual priority threshold values are definable.

* * * * *